E. L. ARTHUR.
AUTOMOBILE TIRE CHAIN HOLDER.
APPLICATION FILED MAY 17, 1919.
1,352,238.  Patented Sept. 7, 1920.
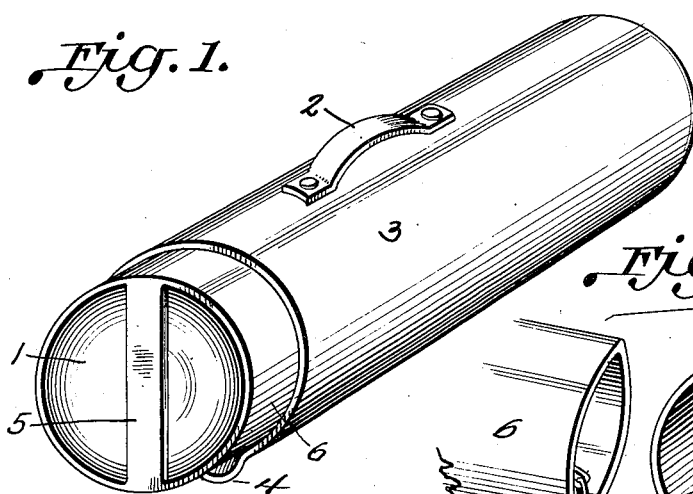
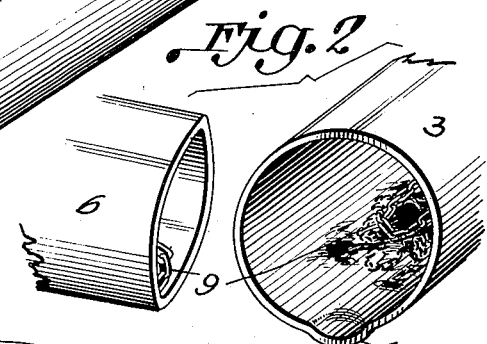
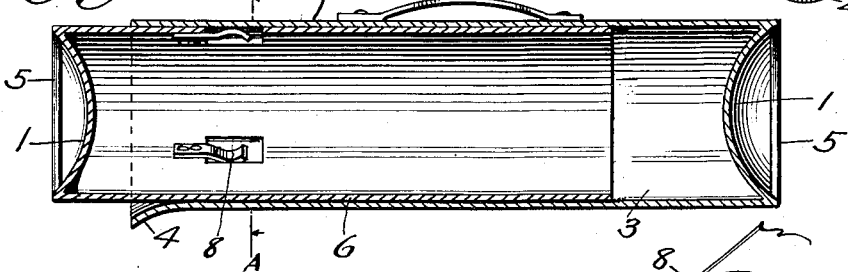
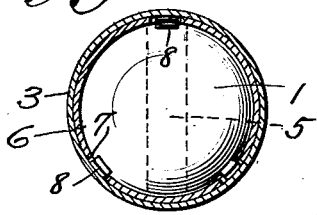
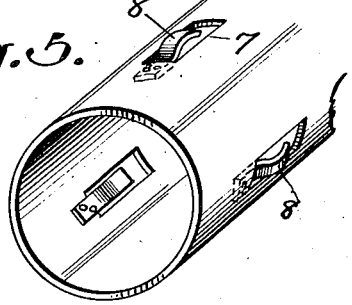
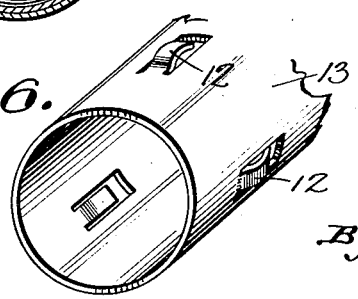
Inventor
Ernest L. Arthur
By Faber & Whitman Co.
Attys.

UNITED STATES PATENT OFFICE.

ERNEST LEMUEL ARTHUR, OF PEMBROKE, VIRGINIA.

AUTOMOBILE-TIRE-CHAIN HOLDER.

1,352,238.  Specification of Letters Patent.  Patented Sept. 7, 1920.

Application filed May 17, 1919. Serial No. 297,815.

*To all whom it may concern:*

Be it known that I, ERNEST LEMUEL ARTHUR, a citizen of the United States, residing at Pembroke, in the county of Giles and State of Virginia, have invented certain new and useful Improvements in Automobile-Tire-Chain Holders, of which the following is a specification.

This invention relates to automobile accessories, and pertains especially to a device for packing and storing tire chains and appliances within automobiles.

The object of the invention is to provide a two-part telescoping casing of novel and peculiar construction for housing tire chains, non-skid devices, tools and appliances, and affording means for conveniently storing the same within an automobile ready and in condition for use when occasion demands, to the avoidance of the usual inconvenience and loss of time handling such chains and devices preparatory to applying them.

A further object of the invention is to provide a two-part tire chain container adapted to have a chain deposited in one part and another chain deposited in the other part, such deposits being made with the chains as taken from the tires, so that, when the said parts are telescopically closed they loosely retain the chain, and may be stored within an automobile as desired.

A still further object of the invention is to provide a device for storing tire chains and the like, and capable of being used in part for carrying water and gasolene, and for various analogous purposes as an automobile accessory.

In the accompanying drawings forming part of this application:—

Figure 1 is a perspective view of my invention.

Fig. 2 is a detail perspective view of the open end of the casings with chains therein preparatory to telescoping.

Fig. 3 is a longitudinal section.

Fig. 4 is a cross section taken on the dotted line A—A Fig. 3.

Fig. 5 is a detail perspective view of part of the inner shell or casing.

Fig. 6 is a perspective view of a modification.

The same reference characters denote the same parts throughout the several views of the drawings.

It is well known that tire chains and their attaching devices, when not in use, are of great inconvenience, occupy considerable space in automobiles, and are objectionable in handling, often by reason of adhering mud and other foreign matter which is usually deposited in automobiles while the chains are being shifted and shaken about during the running of automobiles. Even though such chains may be lodged in a tool box, the other articles contained therein become confused with the chains so that the latter are difficult of extraction, and such other articles are often impaired by deposits from the chains. Therefore it is my purpose herein to avoid all such objections and disadvantages by furnishing a special chain container or carrier adapted to loosely contain such chains and the deposits therefrom, and capable of various other uses.

In carrying out my invention I employ a pair of telescoping casings, each having an open end and a concaved closed end 1 provided with a hand-grasping bar 2 flush with the rim of the closed ends so that the latter forms a base upon which the casings may stand in upright position, especially the outer casing 3 which may be used as a water and gasolene carrier, and for this reason the open end of the casing 3 has a pouring lip 4, and a handle 5 which is also used in handling the container as a whole, and which with the lip 4 prevents rolling movement of the container when stored in an automobile. The inner casing 6 of the container has a plurality of openings 7, and the inner face of this casing is provided with spring tongues 8 working through the slots and against the inner face of the outer casing so as to bind the casings together telescopically and permit relative adjustment of the casings according to the size and number of chains as 9 contained in the casings.

It will be understood that, preferably one chain is deposited in one of the casings and another chain in the other casing, and when this is done direct from the tires, the chains carry more or less mud, grit and other foreign matter into the casings. The casings are then telescopically closed and stored in an automobile. Obviously the gravity movement of the chains in the container will usually free the chains of foreign matter and leave them in usable condition, and such foreign matter will deposit in the closed ends of the casings when it may be shaken out when the container is opened, which is accomplished by grasping the bars 2 and pulling the casing apart. These bars and the concaved ends, it will be observed, are so related as to afford a hand passage therebetween, and when the casings are in telescopical position both chains are within the inner casing, which together with the outer casing forms a double wall.

While I have shown cylindrical casings of thin metal, they may be made in various shapes and sizes, and of various material, and the spring tongues as 12 may be stamped out of an inner cylinder 13, as shown in Fig. 6 of the drawings.

Having thus described my invention what I claim as new and desire to secure by Letters Patent is:—

In an article of the character described, a pair of cylindrical metallic shells having an open end and fitting one within the other, the other end of the shells being closed by a concaved shell member, the outer shell having a hand strap extending lengthwise thereof and a lip protruding from the open end, the inner shell having a plurality of slots adjacent to its closed end, a plurality of plate springs secured to the inner face of the inner shell and having their free ends working through the slots for engaging the inner face of the outer shell, and a flat bar extending centrally across the closed ends flush with the periphery of the shells so as to form seats and hand grasps for the shells.

In testimony whereof I affix my signature in presence of two witnesses.

ERNEST LEMUEL ARTHUR.

Witnesses:
P. G. HUNDLEY,
JANEY B. REEL.